Figures 1, 4:
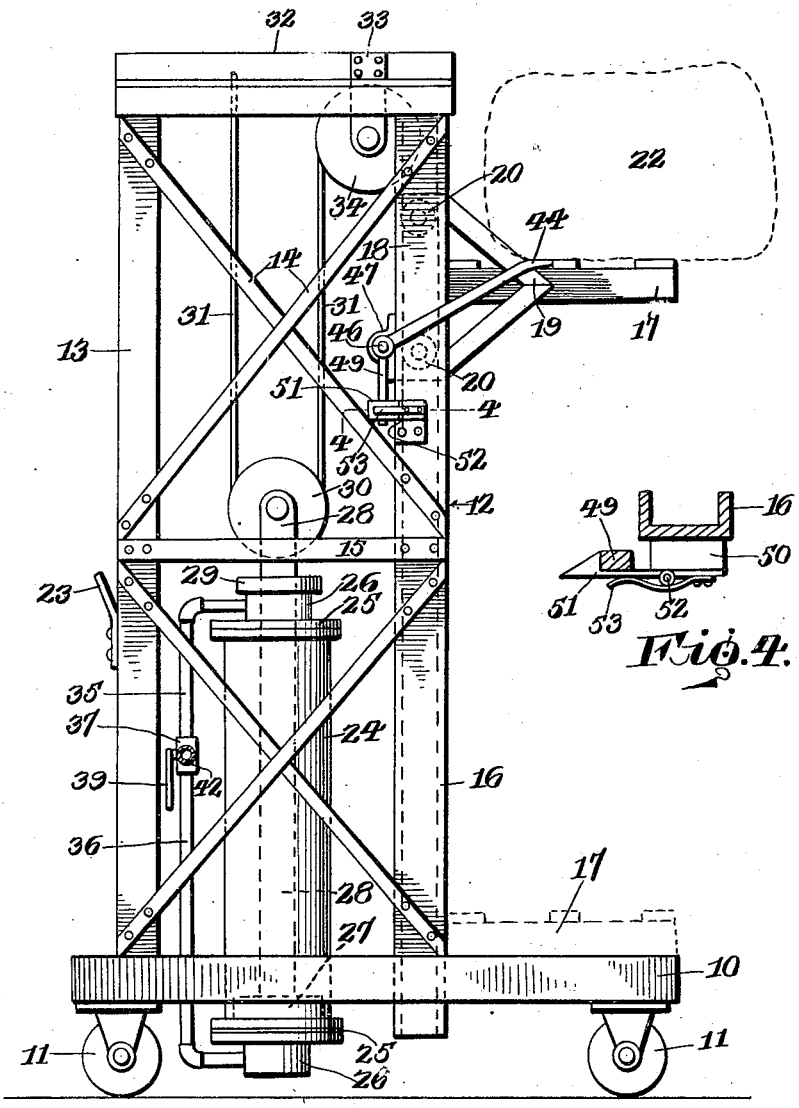

Oct. 1, 1929.  T. K. McCARTER  1,730,281
COTTON TOPPING MACHINE
Filed Sept. 27, 1928   2 Sheets-Sheet 1

INVENTOR.
T. K. McCarter,
BY
Geo. S. Kimmel
ATTORNEY.

Oct. 1, 1929.                T. K. McCARTER                1,730,281
                          COTTON TOPPING MACHINE
                    Filed Sept. 27, 1928        2 Sheets-Sheet 2
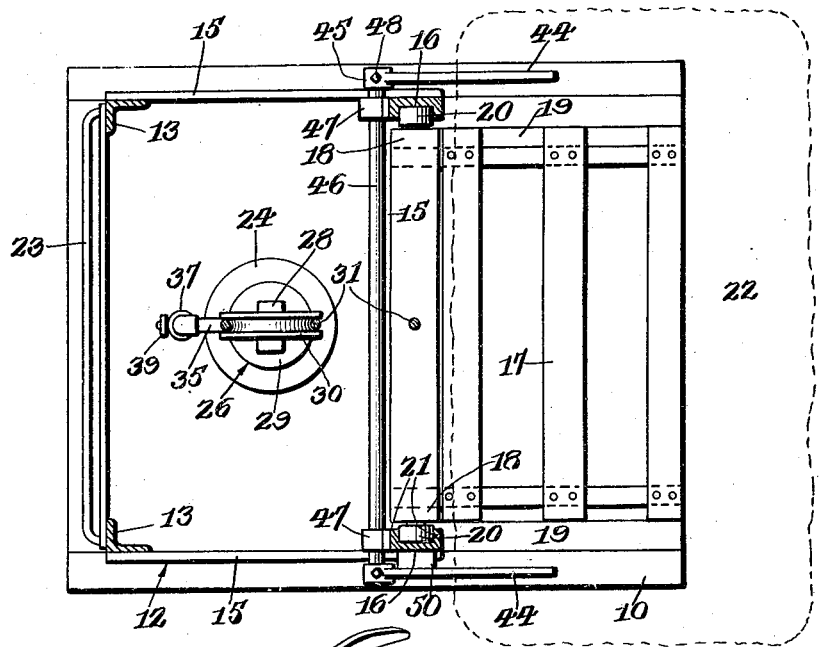
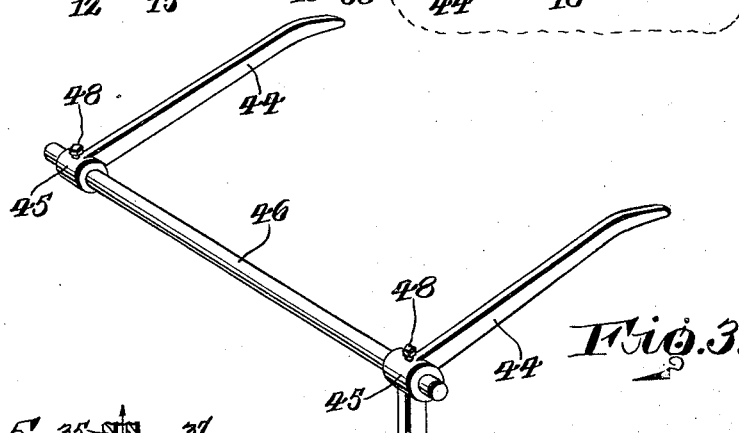
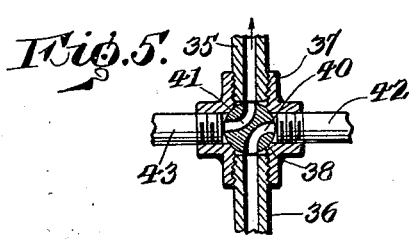
INVENTOR.
T. K. McCarter,
BY
Geo. F. Kimmel
ATTORNEY.

Patented Oct. 1, 1929

1,730,281

UNITED STATES PATENT OFFICE

THOMAS K. McCARTER, OF GALVESTON, TEXAS

COTTON-TOPPING MACHINE

Application filed September 27, 1928. Serial No. 308,823.

This invention relates to an improved cotton bale topping machine and dump, that is, a device for raising or elevating bales of cotton to pack the same one on top of the other, and particularly in loading box cars, so as to fill the latter to capacity.

Heretofore, it was customary to load box cars without topping or stacking the bales one on top of the other, in order to occupy the entire capacity of the car, but as maximum loading is now required, it is necessary to provide means for raising or elevating the bales with quickness and dispatch, so as to stack or top the same one on top of the other to fill the car to its maximum capacity, and to provide power operated means for this purpose, so as to permit the operation to be carried on by one man, instead of six when lifting the bales manually, thereby taking care of the present condition or shortage of labor as well as permitting the work to be carried on more quickly and more economically.

It is therefore the primary object of the invention to provide an elevating or topping machine for cotton bales which may be moved about from place to place and particularly placed in a box car for receiving and raising the bales as the latter are loaded on the car so as to stack or top the same to occupy the entire carrying area and to automatically dump the bales when they have been raised or elevated above another bale.

Another object of the invention is the provision of a device of this character, wherein the mechanism thereof is carried upon a wheeled truck so that the device is readily portable for transportation from one point to another.

Further objects of the invention are to provide a novel dumping mechanism associated with the frame and platform, so as to be thrown beneath the bale when the latter is elevated and be held in this position, so that when the platform is lowered, the bale, which projects from the platform, will be automatically dumped or caused to topple over, thereby effectively stacking of one bale on another without the necessity of manually lifting the bales or throwing the same off of the elevator platform, while in addition, novel means are provided for controlling the actuation of the platform as will be particularly pointed out.

With the above and other objects in view, my invention consists of the novel features of construction, combination of elements and arrangement of parts which will be more particularly pointed out in the following specification and then set out with particularity in the claims appended hereto and which form an essential part of the same.

Reference is had to the accompanying drawings forming a part of this application, wherein like reference characters will refer to corresponding parts throughout the several views, in which Figure 1 is a side elevation of my improved cotton bale topping or elevating and dumping machine or device, Figure 2 is a horizontal cross sectional view of the same, Figure 3 is a perspective view of the dumping lever forming a part of the device for causing the toppling over or dumping of the bales from the platform when elevated.

Figure 4 is an enlarged detail sectional view taken on the line 4—4 of Figure 1, and Figure 5 is a sectional view showing the four-way control valve for causing the raising and lowering of the piston for operating the platform.

Referring to the drawings in detail, my improved cotton bale topping machine or elevator and dump is shown as comprising a wheeled frame 10 forming the base of the machine, supported at the four corners thereof upon swiveled casters or the like indicated at 11, so that the device can be readily moved about. The casters are preferably of the roller or ball bearing type adapted to withstand considerable wear and tear as well as to permit the device to be moved about without much exertion.

Arranged upon the wheeled frame or platform 10 near one end, is an upright or vertical scaffolding or frame 12 which preferably comprises vertical corner joists 13 preferably of angle iron and connected in spaced parallel relation to produce a frame of rectangular cross section, by crossed braces 14 and transverse braces 15 intermediately between upper and lower pairs of crossed braces, said parts being bolted or otherwise secured together to produce a rigid frame structure. The vertical frame members or joists adjacent to the opposite end of the frame or platform 10 are preferably of channel form, as indicated at 16, thereby providing opposed guide ways or tracks for movably receiving an elevator therein.

This elevator comprises a platform 17 having vertical extensions 18 at the inner end thereof at opposite sides, suitably braced to the platform as indicated at 19 and carrying anti-friction rollers 20 operating in the guide ways or tracks 16 against the opposed flanges 21, so as to permit the elevator or platform to move vertically with freedom and with the least possible friction. The elevator platform 17 is of sufficient size to permit the bale indicated at 22, to project from the free edge thereof about one-third of its length and also project at opposite sides, for carrying out of the dumping or tilting over of the bale when elevated, as will be fully described hereafter.

At the opposite side of the scaffolding or frame 12, there is provided a handle 23 which may be grasped, for the purpose of moving the device about, and in order to raise and lower the platform of the elevator, suitable power operated means are provided. Said means include a cylinder 24 extending approximately one-half of the length of the scaffolding or frame 12 and extending below the wheeled frame or platform 10, being suitably supported by the wheeled frame and scaffolding. The opposite ends of the cylinder 24 are closed by heads 25 having reduced cushion heads or compression chambers 26 adapted to cushion the movements of a piston 27 within said cylinder, at each limit of its stroke, so as to avoid hammering or knocking, when the elevator is brought to a stop in a raised or lowered position, with or without a load thereon. The plunger 28 of the piston 27 operates through the upper end of the cylinder, preferably through the medium of a cap 29 threaded on the reduced portion 26 at said end and said plunger carries upon its upper end, a grooved pulley 30 suitably journaled therein, under which is disposed a cable 31 having one end anchored to a cross brace 32, arranged across the top of the scaffolding or frame 12 and preferably comprising spaced angular members or sections of angle iron, from which near one end, is suspended a hanger 33 in the lower end of which is journaled a grooved pulley 34 over which the cable 31 is trained, the free end of the cable extending downwardly for connection with the carriage of the elevator platform 17 intermediately between the opposed spaced guide ways or tracks 16.

Leading into the reduced portions or cushion heads 26 at the opposite ends of the cylinder 24 are branch pipes 35 and 36 leading upwardly and downwardly respectively from a four-way valve including a casing 37 having a turn plug 38 turnable therein and capable of manipulation through the medium of a handle or lever 39 at the rear of the machine opposite to that side in which the elevator platform or table is disposed. The turn plug 38 has a pair of passages 40 and 41 of opposed arcuate curvature extending therethrough and communicating with the periphery of the plug at substantially right angles with respect to their opposite ends. Communicating with one side of the valve casing is an inlet 42 and at the opposite side, an outlet or exhaust 43, the location of the passages 40 and 41, being such that they may be brought into alignment with the inlet and lower portion of the cylinder through the branch pipe 36 or with said pipe and the outlet or exhaust 43, as respects the passage 40, or with the branch pipe 35 and the exhaust 43, or the inlet 42 and said branch pipe 35 for establishing communication with the upper end of the cylinder. By this means, when the valve is in the position shown in Figure 5 of the drawings, air, or other fluid motive power will be discharged into the branch pipe 36 for acting upon the piston within the cylinder 24 so as to raise the same and permit the lowering of the elevator platform or table. In this instance, the exhaust takes place through the branch pipe 35; passage or duct 41 and exhaust or outlet 43, the air entering the inlet 42 and passing into the cylinder through the duct or passage 40 and the branch pipe 36. In another position of the valve, the passage 40 is aligned with the branch pipe 36 and the outlet 43, which in this instance serve as an outlet, while the passage or duct 41 is brought into communication with the inlet 42 and the branch pipe 35, thereby serving to supply air from any suitable source of supply to the top of the cylinder for forcing the piston downwardly, the exhaust taking place at the bottom.

In the latter operation, the plunger is drawn downwardly so as to exert pull upon the cable 31 and by reason of the fact that said cable is arranged over both pulleys and connected to the platform of the elevator so as to form a pulley and cable arrangement with a mechanical ratio of 2 to 1, for each movement of the piston and plunger, the elevator platform is moved twice the distance. The cylinder extends to about midway of the height of the scaffolding or frame 12, the cable will be twice as long as the cylinder and therefore a movement will be imparted to the elevator platform twice the length of the cylinder or equal to the length of both laps of the cable. In this manner, the device may be made of sufficient height to be accommodated within a box car, the height of which is 8½ feet, and still support the platform when in lowered position, about 15 inches from the floor. As the length of a bale is about 60 inches or 5 feet, the elevator will be moved upwardly the proper distance for dumping or topping over a bale onto one previously stored in a car, thereby permitting the topping or elevating operation for stacking the bales, to be carried on with quickness and ease. It will also be seen that by reason of the control of the device through the medium of the valve, for raising and lowering the platform, one man can operate the machine whereas it usually takes six men to lift a bale without stacking or topping the same as quick as the same are compressed, it being understood that the device is especially adapted for use at the compresses, although designed to be used at railway, steamboat or other depots, where it is necessary to store or stack the bales, in transit or otherwise.

Means are also provided for causing the automatic dumping or toppling over of the bales when elevated, as is clearly shown in Figure 1 of the drawings, and this is facilitated by the relation of the bale to the elevator platform or table and the fact that the bale projects beyond the forward and side edges thereof, as previously explained. For this purpose, there is provided a manually set dumping lever comprising a pair of spaced parallel arms 44 keyed as through the medium of sleeve portions 45 with a shaft 46 journaled in bearings 47 carried upon the inner edges of the tracks or guides 16, forming the corner members of the frame at the elevator side, as through the medium of set screws 48. One of the arms is preferably provided with a depending arm 49 constituting a handle for the manual manipulation of the trip means and secured to the adjacent side of the scaffolding or frame, below the adjacent arm 44, is an outwardly offset bracket plate 50 carrying thereon a pivoted catch 51, the pivot or hinge connection thereof being indicated at 52 and a spring 53 serving to hold the catch inwardly displaced so that when the arm 49 is moved beyond the beveled end of the catch, it will be held behind the shoulder thereof as is clearly shown in Figure 4 of the drawings. When the dumping lever is in inoperative position, the arms 44 will extend downwardly and slightly forwardly out of the path of movement of the bale on the raising thereof upon the platform, said arms being positioned outside of the scaffolding or frame and outwardly of the sides of the platform or table 17. This will enable them when brought to operative position to project beneath the projecting sides of the bale when positioned upon the platform, as is clearly shown in Figures 1 and 2 of the drawings. This position of the dumping lever is manually effected after the platform is elevated in the manner previously described, thus bringing the arm 49 into position for engagement by the catch 51, in which position it is held when the platform is lowered to the dotted line position shown in Figure 1, in the manner already described. Thus, as the platform starts down, the lever being held rigid, will cause the dumping or toppling over of the bale, owing to the fact that the bale already projects one-third of its length over the edge of the platform, thereby causing the tipping of the bale easily and automatically and effecting the topping or stacking of the bales one upon the other quickly and conveniently. In this manner, all manual handling of the bale in the topping operation is prevented, thereby permitting a larger amount of work to be done in a given period than can ordinarily be done by six and perhaps twelve men. Furthermore, it is to be understood that the device is particularly designed for topping bales in box cars, being designed to be moved about the floor of the car as explained and capable of turning in the distance of its own base with the platform when in lowered position spaced from the floor for receiving thereon a bale to be stacked or topped as specified. The device may therefore be said to comprise a new article or manufacture replacing the old hand power devices and complying with the requirement of the government, that the cars be packed to capacity, that is to contain seventy-five or one hundred bales and not less than seventy-five in a standard 36 ft. box car of the height of 8½ ft. It is also to be understood that the frame and the scaffolding may be constructed of wood or metal, being made of pipes, angle metal or channels, as desired.

From the foregoing description taken in connection with the accompanying drawings, it is thought that a clear and comprehensive understanding of the construction, operation and advantages of my invention may be had, and while I have shown and described the device as embodying a specific structure, I desire that it be understood that such changes may be made in said structure as do not depart from the spirit and scope of the invention as claimed.

What I claim is:—

1. In a topping or stacking machine for cotton or like bales, a wheeled frame, a scaffolding arranged upon the same, said scaffolding having a guide way, a platform movable vertically in the guide way and supported at a spaced distance from the ground surface upon the frame when lowered and adapted to be elevated a predetermined distance, said platform being designed to support a bale thereon projecting from its free and opposite side edges, means for lowering the platform, and automatic means for engaging the bale at its projecting side portions to dump the same upon the lowering of the platform when the base has been raised, as and for the purposes specified.

2. In a topping or stacking machine for cotton or like bales, a wheeled frame, a scaffolding arranged upon the same, said scaffolding having a guide way, a platform movable vertically in the guide way, and supported at a spaced distance from the ground surface upon the frame when lowered and adapted to be elevated a predetermined distance, said platform being designed to support a bale thereon projecting from its free and opposite side edges, power operated means arranged in the scaffolding and having a cable connected to the platform for raising and lowering the same in the guide ways and an automatic dumping device carried by the scaffolding and arranged to engage the projecting sides of the bales beneath the same, to topple the same over when the platform is lowered after elevating a bale.

3. In a topping or stacking machine of the class described, a wheeled frame, a scaffolding arranged vertically of the frame, an elevator platform projecting from the scaffolding at one side over the frame and adapted to be supported upon the same when in lowered position, means for raising and lowering the platform, arms pivoted at opposite sides of the scaffolding to engage beneath a bale arranged upon the platform, and means to hold said arms in the path of the bale to cause dumping of the same from the platform when the latter is lowered.

4. A topping machine for cotton bales or the like comprising a wheeled frame, a scaffolding arranged upon the same at one end to provide a projecting end adapted to form a support spaced from the floor of a box car in which the device is adapted to be used, a platform movable vertically in the scaffolding and projecting from the same over said projecting part of the frame, a shaft journaled in the scaffolding, arms fixed to the end of said shaft, a depending arm fixed to move with said first mentioned arms, means for raising and lowering the platform, and a catch designed to engage the depending arm for holding the first named arms beneath a bale engaged on the platform when elevated, whereby when the platform is lowered the first named arms will be held against movement to tilt the bale to cause automatic dumping thereof.

5. In a topping or stacking machine for cotton or the like bales, a mobile base, a vertical scaffolding arranged upon the same, said scaffolding having a guide way at one side thereof, a platform movable vertically in the guide way, permanently disposed at right angles with respect to the scaffolding, supported at a spaced distance from the base when lowered and adapted to be elevated a predetermined distance, said platform being designed to support directly thereon a bale projecting from opposite sides of the platform, a vertically disposed fluid pressure operated means positioned within the scaffolding at the lower portion thereof and carrying at its upper end a pulley, a pulley supported from the top of the scaffolding, elevating and lowering cables connected at one end to the top of the scaffolding, passing over said pulleys and having its other end connected to the top of the platform, means for controlling the supply of fluid pressure to said means to provide for the cable elevating and lowering the platform, and means carried by the scaffolding for engagement in the projecting side portions of the bale to dump the latter from the platform on the lowering of the latter with the bale thereon.

In testimony whereof, I affix my signature hereto.

THOMAS K. McCARTER.